Sept. 5, 1967

J. C. CLASON 3,340,350

CABLE AND CLOSURE FOR THREE-PHASE CABLE OF DIFFERENT DIAMETERS

Filed April 8, 1965

INVENTOR

Jan Christiaan Clason,

BY Watson, Cole, Grindle & Watson

ATTORNEYS

Sept. 5, 1967 J. C. CLASON 3,340,350
CABLE AND CLOSURE FOR THREE-PHASE CABLE OF DIFFERENT DIAMETERS
Filed April 8, 1965 2 Sheets-Sheet 2
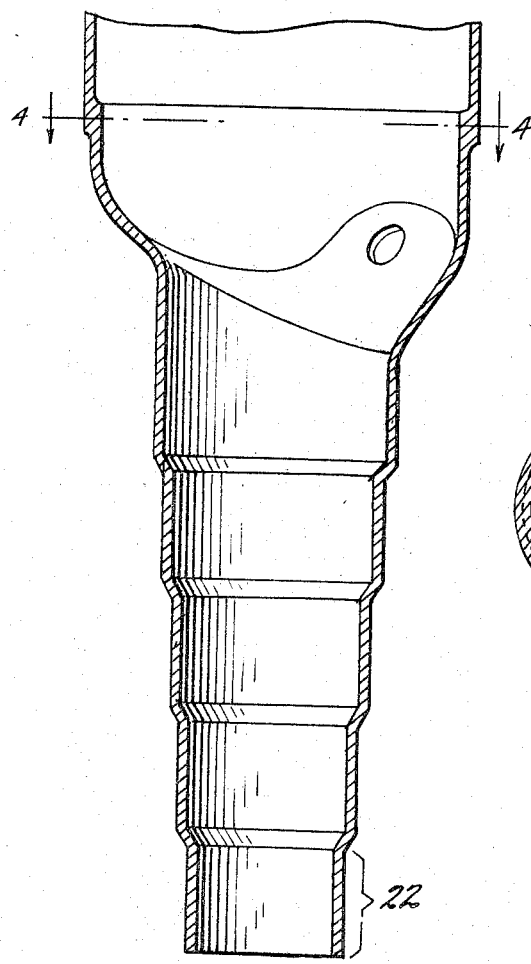
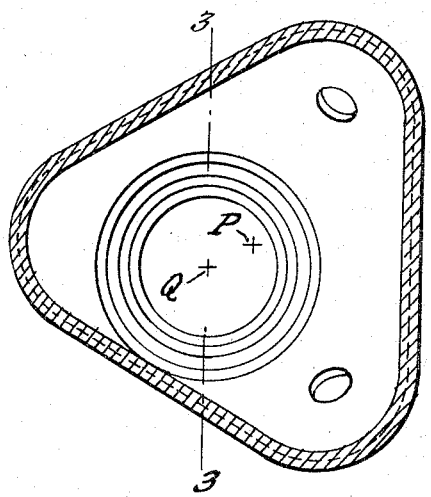
INVENTOR
Jan Christiaan Clason,
BY Watson, Cole, Grindle & Watson
ATTORNEYS United States Patent Office 3,340,350
Patented Sept. 5, 1967

3,340,350
CABLE AND CLOSURE FOR THREE-PHASE
CABLE OF DIFFERENT DIAMETERS
Jan Christiaan Clason, 52 Hengelose Esstraat,
Hengelo, Overijssel, Netherlands
Filed Apr. 8, 1965, Ser. No. 446,512
Claims priority, application Germany, Apr. 8, 1964,
N 24,756
2 Claims. (Cl. 174—74)

This invention relates to a cable end closure for three-phase cables of different diameters.

It is an object of the invention to provide a cable end closure for three-phase cables of different diameters and three connecting terminals or clamps arranged in the form of a equilateral triangle, in which the mid point of the place of entry of the cables into the end closure housing is the same for all the cable diameters, but is spaced from the center of gravity of the equilateral triangle, and in which the spacing of the mid point relative to the center of gravity of the equilateral triangle is dimensioned in such a way that for small, medium and large diameter cables, it is possible, by rotation of the end closure housing to three different positions rotated 120° relative to each other, to secure any of said cables with its outer sheath to the same stationary supporting surface.

Further objects will be apparent from the following description when considered in connection with the accompanying drawings in which:

FIG. 3 is a longitudinal cross-section of the cable end closure housing taken on line 3—3 of FIG. 4; and FIG. 4 is a cross section of the cable end closure housing taken on line 4—4 of FIG. 3 in the direction of the arrows.

Figure 1:
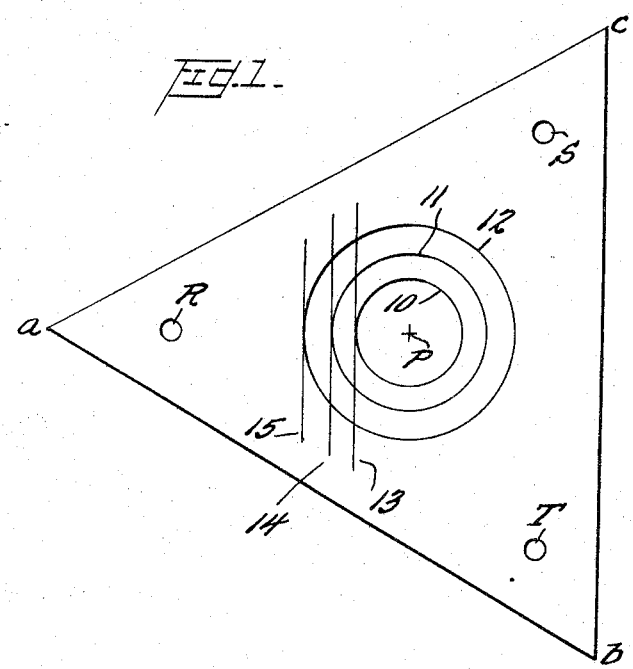
FIG. 1 is a diagrammatic view showing a three phase cable symmetrically arranged in a triangle representing a cable end closure.

Referring to FIG. 1, R, S and T are three terminals or clamps arranged in the form of an equilateral triangle and associated with an electrical apparatus to which the concerned three-phase cable is to be connected. The triangle $a, b, c$ may be considered as the outline of the cable end closure housing in the plane in which the terminals R, S and T for the cable conductors are located. In this cable end closure housing, the three-phase cable may be inserted at a place symmetrically arranged relatively to the terminals R, S, T, viz., in the center of gravity P of the triangle $a, b, c$, so that the outline of the cable for small, medium and large cable diameters will be represented by the circles 10, 11 and 12, respectively.

It is, however, necessary, according to general principles for the mounting or assembly of electrical switch gear, to take into consideration that the cable end closure housing shall not be exposed to any tension from the side of the cable and it is therefore necessary to secure the three-phase cable shortly before its place of entry in the cable end closure housing, to a stationary surface, for example on the frame or support by which the electrical device to be supplied by the cable is carried. The supporting surface for the particular cable will then have to be applied, dependent on the cable diameter used, in a different distance from the center of gravity P, as indicated in FIG. 1 by the vertical lines 13, 14 and 15. One must therefore either select the particular supporting surface according to the diameter of the cable inserted in the end closure housing or one must provide spacing pieces of suitable thickness between a stationary supporting surface and cables of different diameters.

The above drawback of, either having to match the location of the supporting surface to the diameter of the three-phase cable used, or of having to hold in readiness intermediate elements of different thicknesses, is avoided by this invention.

Figure 2:
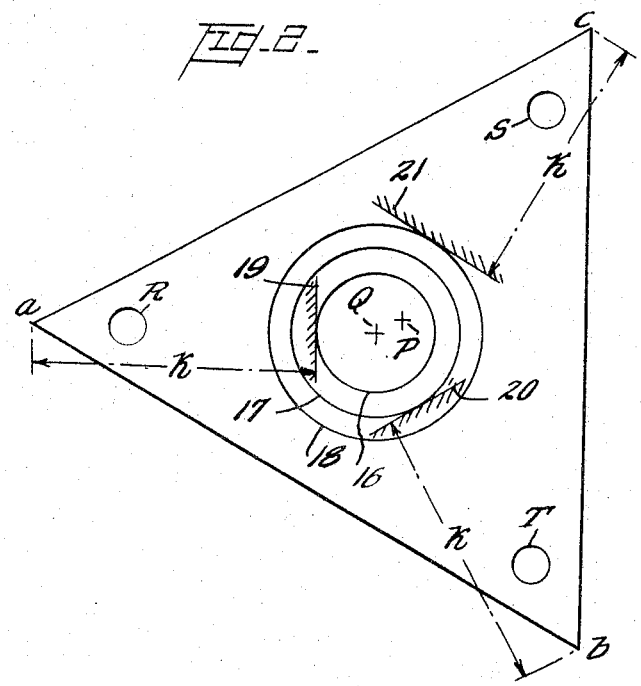
FIG. 2 is a diagrammatic view similar to FIG. 1 with the center of the cable moved a slight distance.

In accordance with FIG. 2 of the drawing, the invention is shown having, as in FIG. 1, the positions R, S, T for the connecting clamps of the electrical apparatus which is to be supplied by the cable. The triangle $a, b, c$ may again be considered as the periphery of a cross-section through the cable end closure housing in the plane of the clamps or terminals R, S, T. If now the place of insertion of the three-phase cable in the end closure housing is made eccentrically relative to the center of gravity P of the triangle $a, b, c$, that is if the axis of the three-phase cable used is made to pass through the plane of the drawing in the point Q, then the three-phase cables of different diameters will be located within the triangle $a, b, c$ in the way indicated by the circles 16, 17 and 18. If one now inserts a cable of small diameter in the cable end closure housing with the cable axis falling on or coinciding with the point Q, then one can secure this cable to the crossed supporting surface 19, which is spaced from the angle point $a$ of the triangle a distance $k$. If one wants to insert a cable of medium diameter, that is with a sheath circumference of a size of the circle 17, in the cable end closure housing, then it is only necessary clockwise to rotate said housing 120° relative to the position shown in FIG. 2, to allow this cable of medium outer diameter to be secured to the same supporting surface 19. This will be evident if, instead of considering a new position of the circle 17 relative to the point $a$ of the triangle, one leaves the circle unchanged and observes its position relative to the point $b$ which is rotated counter-clockwise 120° relative to point $a$. The circle 17 is tangent to a supporting surface 20, which has exactly the same distance $k$ from the point $b$ of the triangle, as the supporting surface 19 has from the point $a$. This means that in a position of the cable end closure housing which is rotated clockwise 120° relative to the position shown in FIG. 2, the medium diameter cable with the circumference 17 may be secured to the same supporting surface 19 as previously used for securing the small diameter cable with the circumference 16. Consequently, the 120° clockwise rotation of the cable end closure housing, on the ground of the eccentric position of the point Q relative to the middle point P of the triangle $a, b, c$ has produced such a shift of the cable center that, in spite of the greater radius of the cable represented by the circle 17 relative to the small cable represented by the circle 16, the same supporting surface 19 can be used.

In the same manner, it is possible to show that by clockwise rotation of the cable end closure housing around 240° relative to the position of FIG. 2 and by the use of a large diameter cable with the sheath outline or contour line 18, the supporting surface 19 can also be used for securing this cable. As proof of this, the triangle shown in FIG. 2 may be rotated counter-clockwise around 240° with unchanged position of the cable center Q, so that the surface 19 will move to the position 21 which again has the same distance $k$ from the point $c$ as the surface 19 has from the point $a$. The circle 18 is tangent to the surface 21, that is in the third position of the end closure a cable of great diameter can be secured to the stationary supporting surface 19 with the same ease as heretofore the cables of small and medium diameter.

By adopting the measure of inserting the cables of different diameters outside of the center of gravity of the triangle $a, b, c$, and by choosing the same size and direction of eccentricity for all cable diameters and in combination therewith using the cable end closure housing in three different positions spaced 120° apart and each determined by the cable diameter concerned, it is possible to employ a stationary supporting surface to which all cables may be attached without reference to their diameter so that a simple mounting or assembly is possible.

The advantages derived from the invention are not lost if, for instance, under the dimensional conditions assumed in FIG. 2, one adds or subtracts for example, approximately 2 mm. as to the outer diameter of the smallest cable. Likewise, for the largest cable diameter an increase in the diameter of approximately 3 or 4 mm., that is, an increase in the radius of 1.5 or 2 mm., is possible without losing the advantages of the invention. The cable to be clamped when being mounted, will only be shifted a few mm. laterally and then can be clamped. One can see from this that in practice one is not limited to just three different cables in definite diameter graduations as assumed in FIG. 2, but that it is possible to utilize more than three different cable sizes in the same cable end closure housing of a given eccentricity.

FIG. 3 of the drawing shows a longitudinal section and FIG. 4 a cross section of a cable end closure housing according to the invention, the cross section as seen from the side of the electrical apparatus to be supplied by the cable concerned. In FIG. 4 the center of gravity of the equilateral triangle and the center point Q of the place of insertion of the cable are indicated in the same manner as in FIG. 2.

FIG. 3 shows that at the place of insertion for the cable the end closure housing is graduated telescopically. The graduations in FIG. 3 and the circles of FIG. 4 relates to the various cable sheath diameters, whereas the circles 16, 17, 18 of FIG. 2 relates to the outer diameters of the cable sheath and armour. When inserting a cable of the smallest sheath diameter the housing can be utilized in the form of FIG. 3; when inserting a cable of the next larger sheath diameter the sleeve section 22 is removed and the rest of the housing is then utilized. Any section can naturally be utilized for two and possibly for three cable diameters if these diameters do not materially differ from each other.

I claim:

1. A cable end closure for three-phase cables of different diameters and three connecting terminals arranged in the form of an equilateral triangle, comprising an end closure housing, the mid point of the place of entry of the cables into the end closure housing being the same for all cable diameters and spaced from the center of the equilateral triangle, the housing for the end closure at the place of insertion of the cable being in diameter-graduated sections adapted to be removed according to the diameter of the cable to be inserted, the spacing of the mid point relative to the center of the equilateral triangle being dimensioned in such a way that for small, medium and large diameter cables, it is possible by rotation of the end closure housing to accommodate three different positions rotated 120° relative to each other, to secure any of said cables with its outer sheath to the same stationary supporting surface.

2. A cable end closure for three-phase cables of different diameters and three connecting terminals arranged in the form of an equilateral triangle, comprising an end closure housing, the mid point of the place of entry of the cables into the end closure housing being the same for all cable diameters and spaced from the center of the equilateral triangle, the housing for the end closure at the place of insertion of the cable being of reduced sections integral with each other adapted to be removed according to the diameter of the cable to be insertion, the spacing of the mid point relative to the center of the equilateral triangle being dimensioned in such a way that for small, medium and large diameter cables, it is possible by rotation of the end closure housing to accommodate three different positions rotated 120° relative to each other, to secure any of said cables with its outer sheath to the same stationary supporting surface.

References Cited

UNITED STATES PATENTS

| 2,836,437 | 5/1958 | Wayman. |
| 3,006,443 | 10/1961 | Siler. |
| 3,148,900 | 9/1964 | Larson. |

FOREIGN PATENTS

| 598,047 | 6/1934 | Germany. |
| 910,966 | 11/1962 | Great Britain. |

LARAMIE E. ASKIN, *Primary Examiner.*

H. HUBERFELD, *Assistant Examiner.*